Patented Feb. 8, 1949

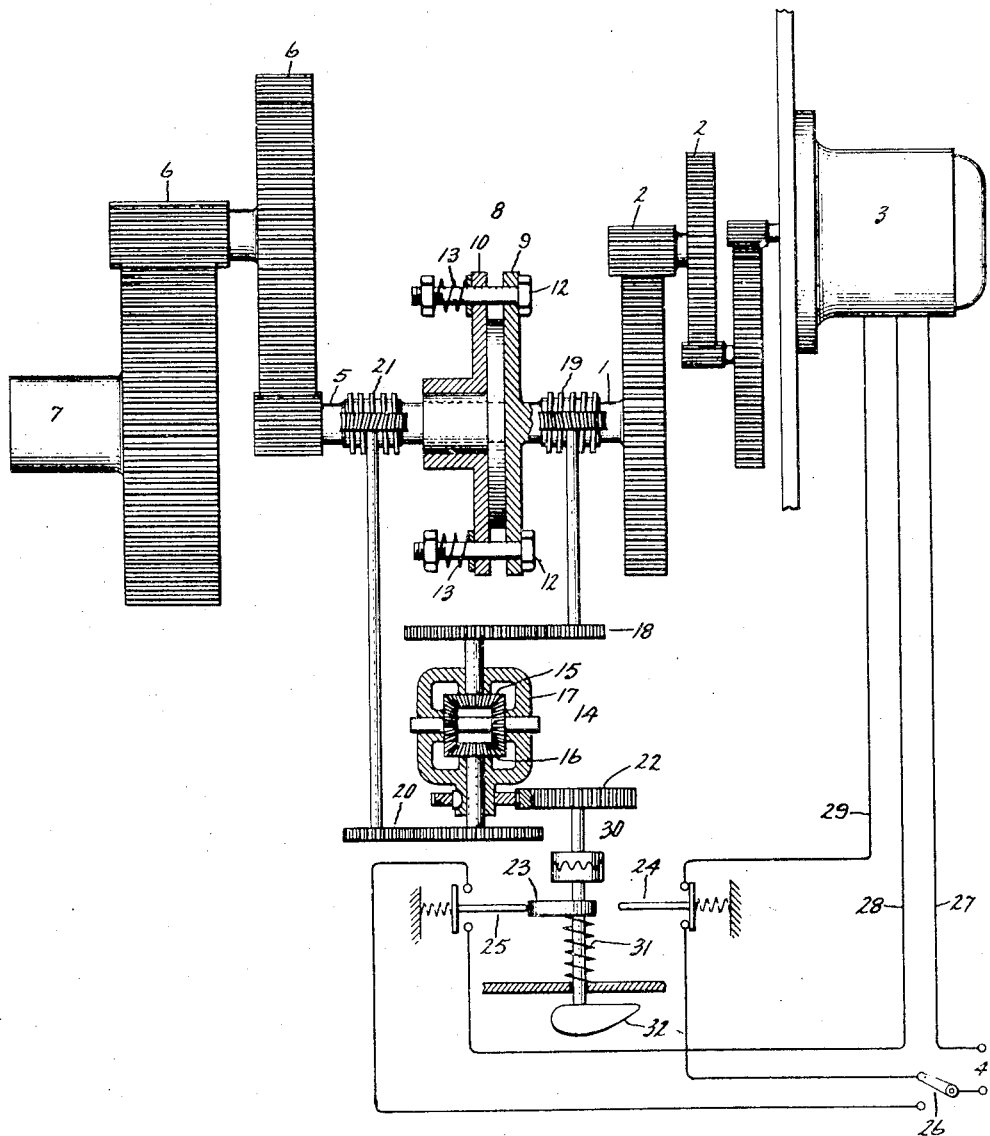

2,461,261

UNITED STATES PATENT OFFICE 2,461,261

OVERLOAD PROTECTION DEVICE FOR POWER TRANSMISSION APPARATUS

John W. Drisko, Schenectady, N. Y., assignor to General Electric Company, a corporation of New York Application January 27, 1947, Serial No. 724,670

8 Claims. (Cl. 318—9)

1

The present invention relates to improved power transmission apparatus having overload protection.

In certain applications of gearing to the mechanical transmission of power, it is desirable to provide some means to limit torque in order to protect the gearing and other mechanical parts against the application of excess load. Torque-limiting clutches have frequently been utilized for this purpose, however, some additional protection is frequently desirable, since after a clutch has started to slip, it will burn out in a relatively short length of time unless the source of driving power is removed or reversed to clear the obstruction. Also, as the slipping of the clutch continues, the resultant increase in temperature tends to cause the clutch to transmit more torque.

It is an object of this invention to provide a simple mechanical arrangement to remove or modify the source of driving power of a power-transmission system including a clutch, after a predetermined amount of clutch slippage.

A feature of this invention, which is applicable to any power-transmission system utilizing a clutch, is the provision of a differential gear unit, two gears of which are independently driven at equal speeds from the input and output faces of the clutch respectively. As long as the clutch does not slip, the cage of the differential unit does not rotate; however, when slippage occurs, the resultant difference in speed of the two gears causes the cage to rotate. This rotation actuates a limit switch removing or modifying the source of driving power after a predetermined amount of clutch slippage.

An advantage of this invention is the fact that power is transmitted by the clutch and not through the gears of the differential. Therefore, the overload protection device may be of light and compact construction adding little to the overall size and weight of the complete power-transmission system.

Further objects and advantages of my invention will become apparent and my invention will be better understood from the following description referring to the accompanying drawing, and the features of novelty which characterize my invention will be pointed out with particularity in the claims annexed to and forming a part of this specification.

The single figure of the drawing illustrates a preferred embodiment of my invention in which a driving shaft 1 is connected to motor 3 through a speed-changing gear train 2, and a driven shaft

2

5 is connected to load-carrying shaft 7 through a speed-changing gear train 6. Motor 3 has terminals for connection to any suitable source of energizing voltage 4. Interconnecting the gear trains associated with driving shaft 1 and driven shaft 5 is a clutch generally identified as 8. While this clutch is shown as being of the spring loaded type having driving faces 9 and 10, driven face 11, guide pins 12, and loading springs 13, it will be understood that any suitable form of friction or magnetic coupling could be used. Moreover, while the system is shown utilizing speed-changing gear trains 2 and 6, the inclusion of these gear trains is not an essential part of this invention and the device in its simplest form could have clutch 8 connected directly to motor 3 and load-carrying shaft 7.

In order to mechanically remove or otherwise modify the energizing voltage 4 on motor 3 when clutch 8 is caused to slip by an excessive torque on shaft 7, the arrangement now to be described is provided. Here, a differential gear unit, generally identified as 14, is connected across faces 9 and 11 of clutch 8. Gear 15 is driven from worm wheel 19 on driving shaft 1 through gear train 18, and gear 16 is independently driven from worm wheel 21 on driven shaft 5 through gear train 20. These two gears are driven in opposite directions and at equal speeds when clutch 8 does not slip. Differential gear unit 14 also includes cage 17, and it can be readily understood that as long as gears 15 and 16 rotate at equal speeds in opposite directions, cage 17 will remain stationary. However, if the application of an excessive torque on load-carrying shaft 7 causes clutch 8 to slip, gears 15 and 16 will rotate at different speeds, thereby causing cage 17 to rotate. Cage 17 is connected through gear train 22 to rotatable cam 23. Limit switches 24 and 25 are actuated by rotation of cam 23 and are connected to modify the voltage 4 on motor 3 in the manner desired. While a differential gear unit having two opposing elements driven at equal speeds in opposite directions is shown, it will be understood that one element and the cage could be driven and the free element connected to the limit switch unit.

As the device has thus far been described, a means has been provided to modify the source of driving power of a power-transmission system responsive to slippage of a clutch. In the embodiment of this invention shown, which is applicable to such devices as wing-flap actuators for aircraft, motor 3 is of the reversible type with input line 27 connected to one side of the source of voltage 4. When the other side of the source of voltage 4 is connected to input line 28, the motor will operate in one direction of rotation, and when connected to input line 29, the motor will operate in the other direction of rotation, the direction of rotation desired being selected by reversing switch 26. Limit switches 24 and 25 are of the normally closed type, one being connected in series with input line 28 and the other being connected in series with input line 29. It will be readily understood that when clutch 8 slips in one direction of rotation, cam 23 will actuate switch 24, and when the slippage is in the opposite direction, switch 25 will be actuated. In operation, when a direction of rotation has been selected by switch 26, an excessive load will cause clutch 8 to slip causing cam 23 to actuate one of the two switches thus opening the associated input line and removing excitation from the motor. However, the other switch will still be in the normally closed position and the motor can be reversed by switch 26 and the device operated in the opposite direction as desired, or until the obstruction is cleared. It will be seen that this embodiment will operate in either direction of rotation. However, if the power-transmission system is of the type which operates in one direction of rotation only, the device can be constructed utilizing only one limit switch to remove or otherwise modify the excitation of the motor on application of excess torque. It will be understood that limit switches of various types can be utilized to modify the excitation of motor 3 in any other manner desired.

To summarize, slippage of clutch 8 caused by excess torque on shaft 7 will be resolved in rotation of cage 17, which rotation is transmitted to cam 23 which actuates switches 24 or 25 to modify or remove the source of voltage 4 on motor 3. Speed-reducing gear trains 18 and 20 are provided to drive gears 15 and 16 at a substantially reduced speed relative to driving shaft 1 and driven shaft 5 so that considerable slippage of clutch 8 will produce only a small rotation of cage 17. Speed-reducing gear train 22 is further provided to substantially gear down the rotation of cage 17 so that clutch 8 can slip a number of turns before switch 24 is actuated. By a proper selection of gear ratios of gear trains 18, 20 and 22, and the design of cam 23, switches 24 or 25 can be actuated after any desired predetermined amount of slippage of clutch 8.

If it is desired that the device will always operate after an exact number of slippage turns of clutch 8, it will be necessary to reset cam 23 to a neutral position each time the device has operated. To perform this function, releasing clutch 30 is connected between gear train 22 and cam 23. Spring 31 is adapted to hold clutch 30 in engagement and reset knob 32 is provided to release clutch 30 to reset cam 23 to the neutral position. It may be seen that the provision of this calibrated reset knob will make it possible to return cam 23 to the same predetermined position after any slippage of clutch 8 has occurred. Then when cam 23 has been returned to this pre-selected position, switch 24 will always be actuated when clutch 8 slips in one direction of rotation and switch 25 will always be actuated when the clutch slips in the opposite direction of rotation. It will also be apparent that clutch 30 can be solenoid actuated and cam 23 spring loaded so that the cam will automatically return to the neutral position when the solenoid energizing circuit is broken. This feature would be desirable in applications where the device is not readily accessible for manual resetting.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. In a power-transmission device with overload protection, the combination of reversible motor adapted to be energized from an external source and having a pair of input conductors arranged for alternative connection to said source whereby said motor may be operated in either direction of rotation, a driving member driven by said motor, a driven member, a friction coupling member interconnecting said driving member and said driven member, differential means operatively connected to said driving member and said driven member and having a portion adapted for movement responsive to a difference in the speed of said driving member and said driven member caused by slippage of said coupling member, a reversing switch for selectively connecting said input conductors to said source, a pair of limit switches respectively in circuit with said input conductors, and means connected with said portion of said differential means and operable thereby in response to a predetermined slippage of said coupling member adapted to actuate one of said limit switches whereby said motor is deenergized after a predetermined amount of slippage of said clutch and said motor cannot be reenergized until said reversing switch is changed to the opposite direction of rotation.

2. In a power-transmission device with overload protection comprising in combination, a reversible motor adapted to be energized from an external source and having a pair of input conductors arranged for alternative connection to said source whereby said motor may be operated in either direction of rotation, a driving shaft driven by said motor, a driven shaft, a clutch interconnecting said driving shaft and said driven shaft, a differential gear unit having one element driven by said driving shaft and another element driven by said driven shaft, said elements being driven at a reduced speed relative to said driving and said driven shafts, a portion of said differential gear unit being adapted for movement responsive to a difference in speed of said driving shaft and said driven shaft caused by slippage of said clutch, a reversing switch for selectively connecting said input conductors to said source, a pair of limit switches respectively in circuit with said input conductors, and means connected to said portion of said differential gear unit and operable thereby in response to a predetermined slippage of said clutch adapted to actuate one of said limit switches whereby said motor is deenergized after a predetermined amount of slippage of said clutch and said motor cannot be reenergized until said reversing switch is changed to the opposite direction of rotation.

3. A power-transmission device with overload protection comprising in combination, a reversible motor adapted to be energized from an external source and having a pair of input conductors arranged for alternative connection to said source whereby said motor may be operated in either direction of rotation, a driving shaft driven by said motor, a clutch interconnecting said driving shaft and said driven shaft, a differential gear unit having an element driven by said driving shaft and another element driven by said driven shaft, said elements being driven at a reduced speed relative to said driving shaft and said driven shaft, a portion of said differential gear unit being adapted to rotate responsive to a difference in the speed of said driving shaft and said driven shaft caused by slippage of said clutch, a reversing switch for selectively connecting said input conductors to said source, a pair of limit switches respectively in circuit with said input conductors, and means in speed-reducing connection with said portion of said differential gear unit and operable thereby in response to a predetermined slippage of said clutch adapted to actuate one of said limit switches whereby said motor is deenergized after a predetermined amount of slippage of said clutch and said motor cannot be reenergized until said reversing switch is changed to the opposite direction of rotation.

4. A power-transmission device with overload protection comprising in combination, a reversible motor adapted to be energized from an external source and having a pair of input conductors arranged for alternative connection to said source whereby said motor may be operated in either direction of rotation, a driving shaft driven by said motor, a driven shaft, a clutch interconnecting said driving shaft and said driven shaft, a differential gear unit having two gears, a speed-reducing gear train interconnecting one of said gears and said driving shaft, and another speed-reducing gear train interconnecting the other of said gears and said driven shaft, said gears being adapted to be driven at equal speed when said clutch does not slip, a portion of said differential gear unit being adapted to rotate responsive to a difference in speed of said gear caused by slippage of said clutch, a reversing switch for selectively connecting said input conductors to said source, a pair of limit switches respectively in circuit with said input conductors, and means including a speed-reducing gear train connected to said portion of said differential gear unit and operable thereby adapted to actuate one of said limit switches whereby said motor is deenergized after a predetermined amount of slippage of said clutch and said motor cannot be reenergized until said reversing switch is changed to the opposite direction of rotation.

5. In a power-transmission device with overload protection comprising in combination, a reversible motor adapted to be energized from an external source and having a pair of input conductors arranged for alternative connection to said source whereby said motor may be operated in either direction of rotation, a driving shaft driven by said motor, a driven shaft, a clutch interconnecting said driving shaft and said driven shaft, a differential gear unit having two gears, a speed-reducing gear train interconnecting one of said gears and said driving shaft and another speed-reducing gear train interconnecting the other of said gears and said driven shaft whereby said gears are driven at equal speeds when said clutch does not slip, said differential gear unit having a portion adapted to rotate responsive to a difference in the speed of said gears caused by slippage of said clutch, a reversing switch for selectively connecting said input conductors to said source, a pair of limit switches respectively in circuit with said input conductors, and means including a speed-reducing gear train interconnecting said portion of said differential gear unit and said switch means adapted to actuate one of said limit switches whereby said motor is deenergized after a predetermined amount of slippage of said clutch and said motor cannot be reenergized until said reversing switch is changed to the opposite direction of rotation.

6. In a power-transmission device with overload-protection, the combination of a reversible motor adapted to be energized from an external source and having a pair of input conductors arranged for alternative connection to said source whereby said motor may be operated in either direction of rotation, a driving member adapted to be driven by said motor, a driven member, a clutch member interconnecting said driving member and said driven member, differential means having an element driven by said driving shaft and another element driven by said driven shaft, a portion of said differential means being adapted to rotate responsive to a difference in the speed of said driving shaft and said driven shaft caused by slippage of said clutch member, a reversing switch for selectively connecting said input conductors to said source, a pair of limit switches respectively in circuit with said input conductors, and means including a rotatable cam connected to said portion of said differential means and operable thereby adapted to actuate one of said limit switches whereby said motor is deenergized after a predetermined amount of slippage of said clutch and said motor cannot be reenergized until said reversing switch is changed to the opposite direction of rotation.

7. In power transmission device with overload-protection, the combination of a reversible motor adapted to be energized from an external source and having a pair of input conductors arranged for alternative connection to said source whereby said motor may be operated in either direction of rotation, a driving member adapted to be driven by said motor, a driven member, a clutch member interconnecting said driving member and said driven member, differential means having an element driven by said driving shaft and another element driven by said driven shaft, a portion of said differential means being adapted to rotate responsive to a difference in the speed of said driving shaft and said driven shaft caused by slippage of said clutch member, a reversing switch for selectively connecting said input conductors to said source, a pair of limit switches respectively in circuit with said input conductors, and means including a speed-reducing gear train and a rotatable cam interconnecting said portion of said differential means and said limit switches whereby said one of said limit switches is actuated after a predetermined amount of slippage of said clutch member.

8. In power transmission device with overload-protection, the combination of a reversible motor adapted to be energized from an external source and having a pair of input conductors arranged for alternative connection to said source whereby said motor may be operated in either direction of rotation, a driving member adapted to be driven by said motor, a driven member, a clutch member interconnecting said driving member and said driven member, differential means having an element driven by said driving member and another element driven by said driven member, said differential means having a portion adapted for motion responsive to a difference in speed of said driving member and said driven member caused by slippage of said clutch member, a reversing switch for selectively connecting said input conductors to said source, a pair of limit switches respectively in circuit with said input conductors, means connected to said portion of said differential means and operable thereby in response to a predetermined amount of slippage of said clutch member adapted to actuate one of said limit switches whereby said motor is deenergized after a predetermined amount of slippage of said clutch and said motor cannot be reenergized until said reversing switch is changed to the opposite direction of rotation, and resetting means for returning said actuating means to the neutral portion after modification of said source of power has occurred.

JOHN W. DRISKO.

REFERENCES CITED

The following references are of record in the file of this patent:

UNITED STATES PATENTS

| Number | Name | Date |
|---|---|---|
| 1,787,930 | Fletcher | Jan. 6, 1931 |
| 2,400,775 | Newell | May 21, 1946 |